:::
United States Patent Office 3,804,876
Patented Apr. 16, 1974

---

3,804,876
PROCESS FOR THE PREPARATION OF BENZYL CYANIDE
Hans Fernholz, Fischbach, Taunus, and Dieter Freudenberger Diedenbergen, Taunus, Germany, assignors to Farbwerke Hoechst Aktiengesellschaft vormals Meister Lucius & Brüning, Frankfurt am Main, Germany
No Drawing. Filed July 17, 1972, Ser. No. 272,546
Claims priority application Germany, July 19, 1971, P 21 35 975.1
Int. Cl. C07c *121/02, 121/08*
U.S. Cl. 260—465 R                   12 Claims

ABSTRACT OF THE DISCLOSURE

The present invention relates to a process for the prepaeration of benzyl cyanide by reacting a carboxylic acid ester of benzyl alcohol with hydrocyanic acid in the gaseous phase using metallic salt catalysts on carriers, at an elevated temperature.

---

The present invention relates to a process for the preparartion of benzyl cyanide by reacting a carboxylic acid ester of benzyl alcohol with hydrocyanic acid in the gaseous phase using metallic salt catalysts on carriers, at an elevated temperature.

The preparation of benzyl cyanide has already been known; it is effected, for example, by reacting benzyl chloride with sodium, potassium or copper cyanide. The main drawback of this method having become known as the cyanide alkylation of Kolbe is to be seen in the fact that metallic salts are necessarily obtained in a stoichiometrical amount, and that the valuable halogen used is completely lost.

Another variant of the method of preparation comprises the thermolytical decomposition of cyanoformiates. in this case benzyl cyanoformiate in particular, at high temperatures in vacuo. Besides the less advantageous physical conditions, this process is also characterized by the drawbacks that a rather expensive starting material is used and that there is a stoichiometrical formation of carbon obtained by pyrolysis, which cannot be used any more.

There has also been proposed a process for the synthesis of benzyl cyanide by using the acid corresponding to the nitrile or the anhydride of this acid, and chlorocyanogen. Besides the loss of the carboxyl proportion, this method has the further drawback that there is an undesired production of acid chloride or hydrogen chloride.

Benzyl cyanide can also be synthesized by the splitting of water from phenyl acetic acid amide or N-formylbenzylamine; however, the difficulty to obtain the starting materials in a pure state already represents a major drawback in this case.

It has now been found that benzyl cyanide can be prepared in a simple manner, without the drawbacks of the processes of the prior art, by using benzyl esters of carboxylic acids and hydrocyanic acid, if the two reactants are passed, in the gaseous phase, over copper-(II)-halide-containing catalysts, at an elevated temperature. This is a surprising fact which could not have been foreseen since it has been known even from recent publications that open-chain aliphatic esters, which also comprise the esters of benzyl alcohol, cannot be reacted with hydrocyanic acid to give nitriles.

The present invention provides a process for the preparation of benzyl cyanide, which comprises passing carboxylic acid benzyl ester and hydrocyanic acid in the gaseous phase over carrier catalysts impregnated with a copper-(II)-salt.

Besides the fact that the starting materials are inexpensive and easily available, the present process has the particular advantage of producing a good yield, together with an excellent space-time yield.

The new process is superior to the older ones in particular by the fact that the carboxylic acids introduced together with the benzyl ester, for example, acetic acid, but also other aliphatic or aromatic carboxylic acids, can easily be separated after the reaction in a pure state and used again for the preparation of the starting material according to known processes, for example, by the acetoxylation of toluene. Thus, no starting substance is lost, and there is a complete cycle with regard to the carboxylic acid component—without the waste problems of the processes of the prior art.

Furthermore, a particularly constant and regular catalytical effect is obtained by the addition of hydrogen halide, in particular hydrogen chloride gas, and/or water and/or oxygen or oxygen-containing gases as auxiliary agents, which are passed over the catalyst either in alternation with the virtual reactants, ester and hydrocyanic acid, or jointly with them. By these measures, benzyl cyanide can be produced economically on a technical scale with an excellent space-time yield, over a long period of time and with a high constant output.

The starting materials used in the process of the invention, i.e. benzyl ester and hydrocyanic acid, may be reacted in an equimolar amount, as well as in a non-stoichiometrical mixture. The reactants can be added in doses either separately, the hydrocyanic acid being passed over the catalyst advantageously directly in the gaseous state, however, they can also be added jointly. In the course of this process, a solution of liquid hydrocyanic acid in the ester used is normally evaporated, and the vapor mixture is passed over the catalyst.

If a reaction component is present in excess, it may be easily separated, fractionated and used again in an unreacted form, together with the carboxylic acid formed, after having passed the reaction zone. This causes the process to become very variable and to be easily performed.

As starting materials there are used hydrocyanic acid on one hand and carboxylic acid esters of benzyl alcohol having up to 10, preferably from 2 to 5 carbon atoms in the carboxylic acid proportion. There may be used, for example; formic acid, propionic acid, butyric acid, valeric acid, caproic acid, enanthic acid, caprylic acid, pelargonic acid, capric acid; moreover cyclic, unsaturated, and dicarboxylic acids. Use is preferably made of acetic acid.

The reaction product obtained in the process of the invention is almost exclusively benzyl cyanide and the carboxylic acid corresponding to the ester used. By-products are obtained only to a minor extent.

Surprisingly, there is no formation of a larger amount of halogen-containing by-products, if hydrogen-halide is used, in spite of excellent space-time yields of far more than 500 g./l. h. of benzyl cyanide. Other secondary reactions, too, are almost completely avoided by the fact that the product mixture is cooled and condensed directly upon leaving the hot catalyst zone.

The reaction mixture is worked up by means of fractional distillation which is effected partly under reduced pressure.

The reaction temperatures of the process of the invention are in the range of from 150 to 400° C., preferably above 200° C., in particular from 200 to 250° C.

The reaction may be effected within a wide pressure range. Preference is given to pressures from 0.1 to 5 atmospheres gage, in particular about 1 atmosphere.

The addition of easily volatile inert substances, such as nitrogen, does not have any adverse effect on the reaction, but is even advantageous, since it helps to prevent the formation of liquid deposits on the catalyst, which results in a higher catalyst efficiency in the long run.

The amount required of the additives used as auxiliary components, for example hydrogen halide, in particular hydrogen chloride, and/or water and/or oxygen or oxygen-containing gases may vary within a wide range.

Hydrogen halide, in particular hydrogen chloride, is preferably used in an amount of from about 0.02 to 0.1 mole per 100 ml. of catalyst and hour, in particular about 0.05 mole per 100 ml. of catalyst volume and hour.

Water may be used in an amount of from about 0.05 to 0.5 mole per 100 ml. of catalyst mixture and hour, in particular 0.1 mole per 100 ml. of catalyst mixture. Oxygen is used in an amount of from 0.01 to 2.0 moles per 100 ml. of catalyst used per hour, in particular 0.1 mole per 100 ml. of catalyst and hour.

As catalysts there are used copper-(II)-salts applied on suitable carriers. Use is made in particular of the halides, preferably the chlorides of bivalent copper. However, nitrates, cyanides, sulfates and acetates may also be used.

The total amount of the catalyst mixture applied on the carrier substance may vary within a wide range, however, it is generally in the range of from 5 to 40%, preferably from 10 to 30%, in particular about 25% of the total amount of catalyst.

The catalyst is advantageously impregnated, in addition, with a Lewis acid. For the process of the invention there may be used, in particular zinc chloride, cobalt-(II)-chloride, nickel - (II) - chloride, manganese - (II) - chloride and iron - (III) - chloride. However, use may also be made of other compounds, such as chromium-(III)-chloride, aluminium chloride, titanium - (III) - chloride, beryllium chloride, zirconium - (IV) - chloride, antimony-(III)-chloride, bismuth - (III) - chloride, tin - (IV) - chloride, molybdenum - (III) - chloride, cadmium chloride, boron-(III) - chloride, gallium - (III) - chloride, indium-(III)-chloride, thallium - (III) - chloride, cerium-(IV)-chloride and vanadium-(III)-chloride. It is also possible to use the analogous bromides. Preference is given generally to zinc, nickel and cobalt chloride, in mixtures as well as separately.

As carrier materials for the catalysts there are used, in the process of the invention, such compounds as silicium dioxide, aluminium oxides, active carbon, zirconium oxide, aluminum silicates, and molecular sieves. However, other carriers are also suitable. Generally, preference is given to silicium dioxide and aluminium oxide.

In the process of the invention, hydrocyanic acid represents an inexpensive and easily accessible cyanide source. Surprisingly, under the conditions of the invention it is able to free the more acidic and difficulty volatile carboxylic acids from their esters.

The reaction in the gaseous phase according to the invention may be carried out in the moving bed, in the fluidized bed, or in the fixed bed. In the case of the continuous preparation of benzyl cyanide, the following method has proved to be the most advantageous of the various process variants.

Hydrocyanic acid and benzyl ester are mixed in the desired mixing ratio, generally in an equimolar amount, and are then evaporated by means of an evaporating apparatus. The mixture which is now in a gaseous state is then passed over the catalyst, while adding nitrogen at the same time. The simultaneous addition by doses of catalytical amounts of hydrogen halides, in particular hydrogen chloride gas, and water leads to a more regular catalyst efficiency, which can also be obtained by an intermittent treatment of the catalyst with hydrogen chloride and water only. A further increase of the catalyst efficiency is obtained by treating the catalyst with oxygen and/or oxygen-containing gases, which may be passed over the catalyst, either jointly with the reaction mixture, or separately in alternating phases. Upon leaving the catalyst reactor, the reaction mixture coming off is cooled and fractionated. The carboxylic acid formed is used again after separation and purification.

The process thus described gives a high sustained efficiency with an excellent space-time yield. The benzyl cyanide obtained may be used, for example, for the preparation of phenyl acetic acid.

The following examples serve to illustrate the invention.

EXAMPLE 1

A mixture consisting of 13.5 g. of hydrocyanic acid and 75 g. of benzyl acetate was introduced in doses within one hour into an evaporation flask heated at 250° C., and the vapor mixture was subsequently blown into the reaction tube heated at 250° C., together with 22.4 liters of nitrogen.

Within the reaction tube there were placed 100 ml. of a copper-(II)-chloride catalyst applied onto aluminium oxide. Upon leaving the contact tube, 85 g. of condensate were collected which contained 41.85 g. of benzyl cyanide. This corresponded to a yield of 72%, calculated on the benzyl acetate used, and to a space-time yield of 419 g./l.·h.

EXAMPLE 2

The reaction was performed as has been described in Example 1. After the operation period of 1 hour, the contact tube was exchanged for a new one, through which the reaction mixture indicated in Example 1 was passed within 1 hour. At a temperature of about 250° C., a mixture of 9 g. of water and 6 liters of hydrogen chloride gas was blown for 30 minutes over the catalyst used in the first hour. Subsequently, 11.2 liters of air were passed over the catalyst within another 30 minutes, in which process the catalyst temperature was increased to 400° C.

After this time, at a temperature of 250° C., hydrocyanic acid and benzyl acetate were again introduced in the amount indicated in Example 1 of ½ mole per hour each, whereas now the second catalyst was treated as has been mentioned above. Thus, a constant output of about 86 g. of reaction mixture was obtained which contained 53 g. of benzyl cyanide on an average, which corresponded to a space-time-yield of about 530 g./l.·h.

EXAMPLE 3

The reaction was performed as has been described in Example 1. 1 liter of hydrogen chloride gas was passed over the catalyst within 1 hour, together with the mixture used in Example 1 of ½ mole per hour each of benzyl acetate and hydrocyanic acid. Iin this manner, during an operation period of 6 hours, benzyl cyanide was obtained with an average space-time yield of 490 g./l.·h.

EXAMPLE 4

Within 1 hour, a mixture consisting of ½ mole of benzyl propionate (82 g.) and ½ mole of hydrocyanic acid (13.5 g.) was introduced into an evaporation flask, and the vapor mixture was then passed, together with 22.4 liters of nitrogen, over a copper - (II) - chloride - cobalt-(II)-chloride catalyst on a $SiO_2$ carrier heated at 250° C. 92 g. of reaction mixture were obtained, which contained 41.2 g. of benzyl cyanide.

We claim:
1. A process for the preparation of benzyl cyanide, which comprises passing a carboxylic acid benzyl ester of a carboxylic acid selected from the group consisting of formic acid, acetic acid, propionic acid, butyric acid, valeric acid, caproic acid, enanthic acid, caprylic acid, pelargonic acid and capric acid and hydrocyanic acid in the gaseous phase over a supported catalyst consisting essentially of a bivalent copper salt selected from the group consisting of the halides, nitrates, cyanides, sulfates and acetates of copper impregnated on a carrier material selected from the group consisting of silicium dioxide, aluminum oxides, active carbon, zirconium oxide, aluminum silicates, and molecular sieves at a temperature in the range of from 150 to 400° C. and under a pressure of from 0.1 to 5 atmospheres gage.

2. A process as claimed in claim 1, which comprises using a benzyl acetate.

3. A process as claimed in claim 1, wherein the carrier catalyst contains a copper-(II)-halide.

4. A process as claimed in claim 1, wherein the catalyst has been impregnated additionally with a compound selected from the group consisting of the chlorides or bromides of zinc, cobalt-(II), nickel-(II), manganese-(II), iron-(III), chromium - (III), aluminum, titanium - (III), beryllium, zirconium - (IV), antimony - (III), bismuth-(III), tin - (IV), molybdenum - (III), cadmium, boron-(III), gallium - (III), indium - (III), thallium - (III), cerium-(IV) and vanadium-(III) or mixtures thereof.

5. A process as claimed in claim 4, wherein the Lewis acid is selected from the group consisting of zinc chloride, nickel chloride, and cobalt chloride.

6. A process as claimed in claim 1, which comprises using aluminium oxide as carrier material.

7. A process as claimed in claim 1, wherein silicium dioxide is used as carrier material.

8. A process as claimed in claim 1, which comprises carrying out the reaction in the presence of a substance selected from the group consisting of hydrogen chloride, water, oxygen, and gases containing molecular oxygen.

9. A process as claimed in claim 8, wherein the amount of hydrogen halide introduced is in the range of from 0.02 to 0.1 mole per 100 ml. of catalyst an hour.

10. A process as claimed in claim 8, wherein the amount of water introduced is in the range of from 0.05 to 0.5 mole per 100 ml. of catalyst an hour.

11. A process as claimed in claim 8, wherein the amount of oxygen introduced is in the range of from 0.01 to 2.0 moles per 100 ml. of catalyst an hour.

12. A process as claimed in claim 1, which comprises carrying out the reaction in the presence of nitrogen.

References Cited
UNITED STATES PATENTS

| | | | |
|---|---|---|---|
| 3,558,688 | 1/1971 | Drinkard, Jr. | 260—465.9 |
| 3,711,527 | 1/1973 | Kurtz | 260—465.8 |
| 3,461,149 | 8/1969 | Hardy et al. | 260—453 AP |

JOSEPH PAUL BRUST, Primary Examiner

U.S. Cl. X.R.

260—413, 540, 541, 542